United States Patent [19]

Tamaru et al.

[11] 3,715,469

[45] Feb. 6, 1973

[54] COLOR TELEVISION RECEIVER

[75] Inventors: Hideshi Tamaru, Kanagawa; Yoshio Ishigaki, Tokyo, both of Japan

[73] Assignee: Sony Corporation, Tokyo, Japan

[22] Filed: June 11, 1971

[21] Appl. No.: 152,255

[30] Foreign Application Priority Data

Nov. 17, 1970 Japan ..............................45/101287

[52] U.S. Cl. ..............................................178/5.4 P

[51] Int. Cl. ..............................................H04n 9/02

[58] Field of Search .178/5.4, 5.4 P, 5.4 CD, 5.4 MA, 178/5.4 S, 6.6 A, 5.4 C, 5.4 SD

[56] References Cited

UNITED STATES PATENTS

| | | | |
|---|---|---|---|
| 3,597,530 | 8/1971 | Hartwich | 178/5.4 P |
| 3,548,091 | 12/1970 | Blockwoldt | 178/5.4 CD |
| 3,627,910 | 12/1971 | Janssen et al. | 178/5.4 P |
| 3,449,510 | 6/1969 | Steinkoff | 178/5.4 P |

*Primary Examiner*—Richard Murray

*Attorney*—Lewis H. Eslinger, Alvin Sinderbrand and Curtis, Morris & Safford

[57] ABSTRACT

A decoding system for PAL television signals. One line of chrominance information is applied to synchronous demodulators and, by means of a switching circuit and delay means, the same line, delayed one line interval, is again applied to the same demodulators. The reference sub-carrier generating means to be controlled by synchronizing color bursts is switched to be controlled, on alternate lines, first by direct burst signals and then by inverted burst signals so that the phase of the reference sub-carrier signal will be between the phases of the controlling signals and will reverse polarity between lines. The phase of the reference sub-carrier signal may be adjustable for hue control.

22 Claims, 21 Drawing Figures

INVENTOR.
HIDESHI TAMARU
BY YOSHIO ISHIGAKI
Lewis H. Eslinger

INVENTOR
HIDESHI TAMARU
BY YOSHIO ISHIGAKI
Lewis H. Eslinger

INVENTOR
HIDESHI TAMARU
YOSHIO ISHIGAKI
BY Lewis H. Eslinger

INVENTOR
HIDESHI TAMARU
BY YOSHIO ISHIGAKI
Louis H. Eslinger

INVENTOR
HIDESHI TAMARU
BY YOSHIO ISHIGAKI

Lewis H. Eslinger

INVENTOR
HIDESHI TAMARU
YOSHIO ISHIGAKI
BY Lewis H. Eslinger

COLOR TELEVISION RECEIVER

BACKGROUND OF THE INVENTION

1. Field of the Invention

This invention relates to color television receivers adapted to receive signals transmitted in accordance with the phase alternation by line system commonly referred to as the PAL system. In particular, the invention relates to a decoding system for use in a color television receiver to receive signals transmitted according to the PAL system.

2. The Prior Art

In the PAL system two color difference components containing chrominance information are simultaneously encoded when they are combined by suppressed-carrier quadrature amplitude modulation on a color sub-carrier within the video frequency band. If there is any phase distortion in the transmission path between the encoder at the television station and the demodulators at the receiver, this phase distortion is likely to remain reasonably constant for a period of time much longer than a television line interval. The hue of the television image reconstructed by the receiver from the received signal is determined by the phase angle of the chrominance signal and is, therefore, adversely affected by phase distortion unless it is cancelled out. The PAL system effects cancellation of the phase error by reversing the color sequence at the end of each line. Information as to the color sequence of each line is encoded in the phase of the burst signal preceding that line by shifting the phase of the burst signal 90° forward for one line and 90° back for the next line. Phase distortion that would tend to make the image shift toward the blue end of the color spectrum for one color phase sequence presented during one line will still produce the same phase error in the succeeding line. However, because of the difference in phase sequence between the initial line and the succeeding line, this phase error now shifts the hue toward the red end of the spectrum. Assuming reasonably constant luminance and recognizing the fact that the information in one television line is very little different from that in the next line, the two shifts in hue, one in the blue direction and the other in the red direction, tend to cancel each other out.

In the so-called simple PAL receiver, this cancellation is obtained by visual averaging of the line, but this tends to produce an effect known as a line crawling "-Venetian blind" pattern. It is also possible in a more complex PAL receiver to average but the errors by delaying the chrominance signal by exactly one line interval of time and then combining the delayed signal with the signal for the next scanning line. This substantially eliminates the spurious venetian blind line patterns at the price of reduced vertical chrominance resolution and at the further price of greatly increasing the complexity of the receiver.

Although the PAL system eliminates phase shift errors that produce a change in hue, it also makes it impossible to change hue deliverately by means of a hue control. Such change is sometimes desirable to correct for effects having nothing to do with phase error.

A co-pending application, Ser. No. 90,904, filed Nov. 19, 1970, entitled Color Television receiver, and assigned to the assignee of the present application discloses a novel system for decoding pal color television signals in such a way as to avoid some of the limitations inherent in existing pal decoders. The aforesaid novel system also is theoretically capable of receiving signals transmitted either on the PAL system or on the so-called NTSC system used in the United States, although the actual sub-carrier frequencies used in these two television systems makes it impossible to take advantage of this latter feature.

The encoding system of the co-pending application includes a switching circuit and delay means connected to receive the incoming chrominance signal. This chrominance signal is first transmitted directly to the demodulators, for one interval of time, and then the same information, delayed one line interval of time, is again transmitted through switching circuit to the demodulators for the next line interval. The chrominance information transmitted from the television station during the second line interval is not used by the receiver. The signal transmitted during the third line interval is passed, undelayed, to the demodulators and is repeated, in delayed form, during the fourth line interval of time.

It is one of the objects of the present invention to improve the decoding system of the aforesaid application, Ser. No. 90,904. Another object is to provide a system in which the sub-carrier reference signals will automatically be presented to the demodulators in the proper phase relationship. A further object is to provide simplified means for adjusting the hue of the image in a receiver operated by PAL color television system signals. Still further objects will be apparent from the following specifications, together with the drawings.

SUMMARY OF THE INVENTION

In accordance with the present invention, separate oscillators are provided for the sub-carrier reference signals and these oscillators are controlled by burst signals which are connected by switching means to control circuits for the oscillators. The control circuit for one oscillator is switched to receive a burst signal without inversion for one line and with inversion for the next line. The other control circuit receives each burst signal without inversion. The output of one oscillator may be inverted to produce a sub-carrier having the proper phase to achieve correct demodulation of the two color components.

DESCRIPTION OF THE PREFERRED EMBODIMENTS

Figure 1:
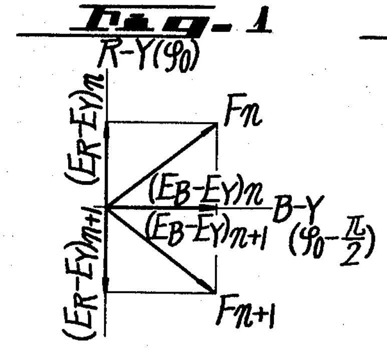
FIG. 1 is a vector diagram for explaining the encoding and decoding of a PAL television system.

The essence of the PAL color television system is in the phase relationship between the two color difference signals modulated on a common sub-carrier to form a chrominance signal. This phase relationship is shown in FIG. 1. One of the chrominance components, $E_B - E_Y$, contains information concerning blue components of the television image. The other, $E_R - E_Y$, contains information relating to red components. Both of these chrominance components are modulated on the same carrier, or more properly the same sub-carrier, but the modulation is performed separately and in such a way that for a given interval of time corresponding to one line of the color television image, the carrier on which the chrominance component $E_R - E_Y$ is modulated has a phase $\phi_o$. During the same interval of time the carrier on which the other chrominance component $E_B - E_Y$ is modulated has a phase $\phi_o - \pi/2$. It is for this reason that the chrominance component $(E_B - E_Y)_n$ representing blue information during a given line interval n is represented as a horizontal arrow and the red chrominance component $(E_R - E_Y)_n$ during the same line interval n is represented by a vertical arrow. Vector addition of these two chrominance components produces a resultant signal $F_n$, which is a complex voltage defined by the equation $F_n = (E_B - E_Y)_h + j(E_R - E_Y)_n$.

The phase relationship for the following line $n + 1$ is also represented in FIG. 1. In this case, the blue chrominance component for the line $n + 1$ is $(E_B - E_Y)_{n+1}$, which has the same direction as the component $(E_B - E_Y)_n$. However, in accordance with the PAL system, the red chrominance component $(E_R - E_Y)_{n+1}$ is inverted from the chrominance component that characterized the preceding line $n$. Thus, the equation for the signal $F_{n+1}$ is $F_{n+1} = (E_B - E_Y)_{n+1} - j(E_R - E_Y)_{n+1}$.

Figure 2:
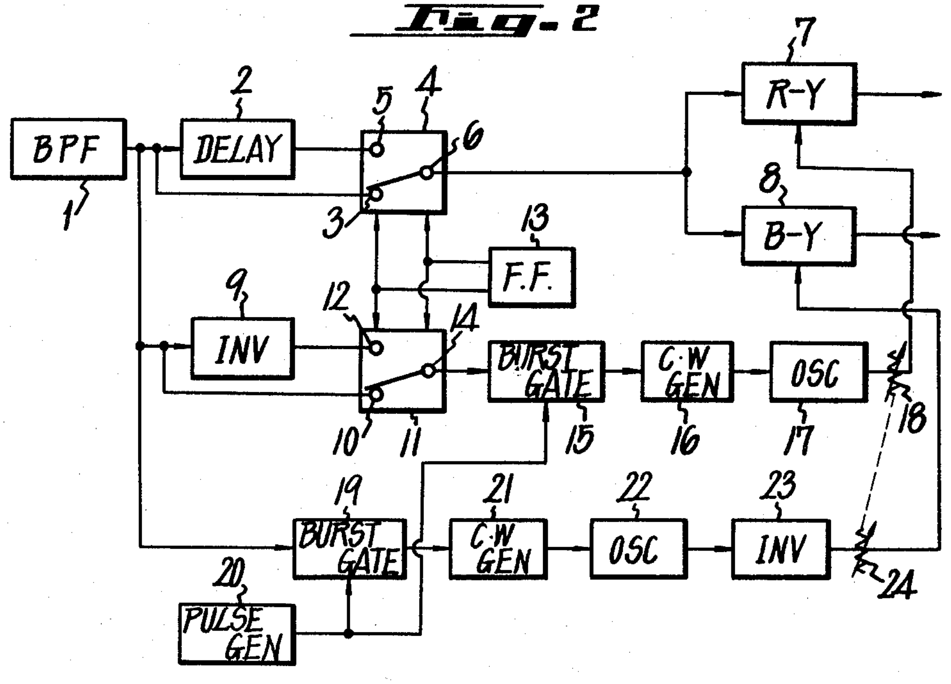
FIG. 2 is a block diagram of one embodiment of a decoding system according to the present invention.

FIG. 2 is a block diagram of a decoding system for use in a color television receiver capable for receiving signals transmitted according to the PAL system and displaying a color television image generated by those signals. The input of the decoding system is at a band pass amplifier 1 which is tuned to transmit the chrominance signals of a composite color television signal. The output of the band pass amplifier 1 is connected to the input of a delay circuit 2 and to one input terminal 3 of a switching circuit 4. The output of the delay circuit 2 is connected to a second input 5 of the switching circuit 4, which operates, in effect, as a single-pole-double-throw switch. The switching circuit has an output terminal 6 that is connected to input terminals of two demodulators 7 and 8 in which the color difference signals are separated from each other.

The output of the band pass amplifier 1 is also connected to an input terminal of an inverter 9 and to one input terminal 10 of a second switching circuit 11. The output of the inverter 9 is connected to a second input terminal 12 of the switching circuit 7, and both switching circuits 4 and 11 are connected to a flip-flop 13 to have their operation controlled thereby. The output terminal 14 of the switching circuit 11 is connected to a burst gate 15. the output of the burst gate 15 is connected in turn to a continuous wave generator 16, which may be a crystal oscillator, and the output of the continuous wave generator 16 is connected to an oscillator 17 to control its operation. Signals from the oscillator 17 are connected through a phase shift control circuit 18 to the demodulator 7.

The output of the band pass amplifier 1 is also connected to a second burst gate circuit 19. This circuit, and the burst gate circuit 15, are connected to a gate generator 20 to be controlled thereby. The output of the burst gate circuit 19 is connected to a continuous wave generator 21, which may be a crystal oscillator, and the output of the continuous wave generator 21 is connected to an oscillator 22 to control the operation thereof. the output signal from the oscillator 22 is connected in turn to another inverter 23, which supplies signals to a second phase control circuit 24, and signals from this second phase control circuit are connected to the demodulator 8.

The circuit in FIG. 2 will be described in conjunction with the phase diagrams in FIGS. 3–5. the chrominance signal transmitted through the band pass amplifier 1 is delayed in the delay circuit 2 by one line period of time and is applied, in this delay condition, to the input terminal 5 of the switching circuit 4. The same chrominance signal is also applied directly to the input terminal 3. It is to be understood that the signals applied to the terminals 3 and 5 are present at those terminals all of the time but are transmitted through the switching circuit alternately under the control of the flip-flop 13. As a result, the output signal from the terminal 6 of the switching circuit 4 consists of an undelayed signal for one line interval when the terminal 3 is connected through to the output terminal 6, as shown. During the next line interval, the flip-flop 13 actuates the switching circuit 4 to connect the input terminal 5 to the output terminal 6. As a result, the same signal is again present at the output terminal 6. In the third line interval, the switching circuit 4 is returned to the condition shown in FIG. 2 so that a new undelayed signal two lines later than the first undelayed signal is transmitted through to the demodulators 7 and 8. In the fourth interval of time, the switching circuit 4 is changed to the opposite condition in which the output terminal 6 is connected to the input terminal 5 and, because of the delay produced by the circuit 2, the signal present during the third interval of time is again transmitted to the demodulators 7 and 8. Thus, the demodulators 7 and 8 receive the same signal for two successive line intervals of time and then another signal for the next two line intervals of time, and so on.

In order to demodulate the signals properly, the demodulators 7 and 8 must be supplied with reference signals having the proper phase relationships.

When the switching circuit 4 is in the condition indicated in FIG. 2 at the time of arrival of a signal in which the modulation axis for one color signal, namely, for the red color difference signal in the present example, has the phase $\phi_o$ (hereinafter referred to as a plus signal), a plus signal is produced at the output of the demodulator. During the next line interval, which corresponds to the time of arrival of a signal in which the modulation axis for the red color difference signal has the phase $-\phi_o$ (hereinafter referred to as a minus signal), the switching circuit 4 is switched to the opposite condition. As a result, only plus signals are sequentially derived, twice each, from the switching circuit 4 in the order $F_n$, $F'_n$, $F_{n+2}$, . . . , and no minus signal is derived therefrom. The signals with primes represent signals that have passed through the delay circuit 2. When supplied with these plus signals and with reference sub-carrier signals for demodulation having phase $\phi_0$, the demodulator 7 derives a train of demodulated color signals in the following order: $(E_R - E_Y)_n$, $(E_R - E_Y)'_n$, $(E_R - E_Y)_{n+2}$, $(E_R - E_Y)'_{n+2}$ . . . etc. at the same time the demodulator 8 is supplied with reference sub-carrier signals having a phase $\phi_o - \pi/2$ and produces a train of demodulated color signals in the order: $(E_B - E_Y)_n$, $(E_B - E_Y)'_n$, $(E_B - E_Y)_{n+2}$, $(E_B - E_Y)'_{n+2}$, . . . . The signals with primes represent demodulated signals of those signals that have passed through the delay circuit 2.

If, at the arrival of the plus signal, the flip-flop circuit 13 is reversed to cause reversal of the switching circuit 4 to the position opposite to the illustrated one and is changed back to the illustrated position at the arrival of the minus signal, only minus signals are sequentially derived twice from the switching circuit 4 in the following order: $F_{n+1}$, $F'_{n+3}$, $F'_{n+3}$, . . . and no plus signals are derived therefrom. In such a case, a reference sub-carrier signal having a phase $-\phi_o$ is applied to the demodulator 7 without restoring the flipping of the flip-flop circuit 13 to the initial condition and hence without restoring the switching circuit 4 to its initial condition. Also in this case, the demodulator 8 is supplied with the reference sub-carrier signal of the phase $\phi_0 - \pi/2$ as in the foregoing. As a result of this, a train of demodulated color signals $(E_R - E_Y)_{n+1}$,$(E_R - E_Y)'_{n+1}$, $(E_R - E_Y)_{n+3}$,$(E_R - E_Y)'_{n+3}$, . . . is derived from the demodulator 7, and a train of $(E_B - E_Y)_{n+1}$,$(E_B - E_Y)'_{n+1}$,$(E_B - E_Y)_{n+3}$, $(E_B - E_Y)'_{n+3}$, . . . is derived from the demodulator 8.

To perform such demodulation, a burst signal is produced for one line period in which the modulation axis for the red color difference signal has the phase $\phi_0$. another signal opposite in phase to the burst signal for the next line period, in which the modulation axis for the red color difference signal has the other phase $-\phi_0$, is produced under control of the switching circuit 4. A reference sub-carrier signal of a predetermined phase between the phases of both of these signals is produced based upon them and is supplied to the demodulator 7 to demodulate the one color signal, namely, the red color difference signal.

Figure 3A:
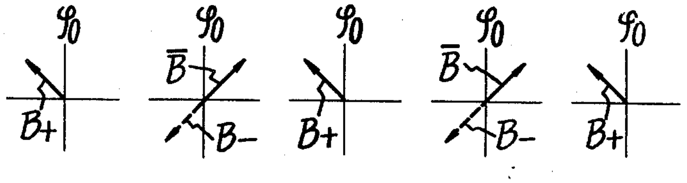
FIGS. 3A–3D, 4A–4C, & 5 are vector diagrams for explaining the decoding system of FIG. 2.
Figure 3B:
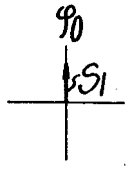

In the example depicted in FIG. 2, the chrominance signal from the band pass amplifier 1 is applied directly to one input terminal of another switching circuit 11. The chrominance signal is also applied to another input terminal of the switching circuit 11 through a phase inverter circuit 9, and the switching circuit 11 is changed over at every horizontal scanning. The changeover of the switching circuit 11 is ganged with that of the switching circuit 4 and is controlled by the alternating signal from the flip-flop circuit 13. When the switching circuit 4 is in the position indicated in the figure at the arrival of the plus signal, the switching circuit 11 is also in the position indicated in the figure. Both switching circuits 4 and 11 are changed over to the position opposite to the indicated one at the arrival of the minus signal by operation of the flip-flop circuit 13. The signal derived from the switching circuit 11 is supplied to a burst gate circuit 15, which is controlled by a gate signal supplied from a gate generator circuit 20, to transmit the burst signal applied to a continuous wave generator circuit 16 made up of a crystal oscillator. Accordingly, when the plus signals $F_n$, $F'_n$, $F_{n+2}$, $F'_{n+2}$, . . . are continuously derived from the switching circuit 4 and are supplied to the demodulators 7 and 8, the plus chrominance signal and a signal opposite in phase to the minus chrominance signal are alternately derived from the switching circuit 11 in the following order: signal $F_n$, a signal opposite in phase to the signal $F_{n+1}$, the signal $F_{n+2}$, a signal opposite in phase to the signal $F_{n+3}$, . . . As a result of this, and as shown in FIG. 3A, the burst signal $B_+$, which is contained in the plus signal and is advanced in phase by 45° relative to the $R - Y$ axis and a signal $\bar{B}_-$, which is delayed by 45° relative to the R − Y axis and is, therefore, opposite in phase to the burst signal $B_-$ contained in the minus signal indicated by a broken line, are alternately derived from the gate burst circuit 15. The continuous wave generator 16 has a long time constant so that it is controlled by both signals $B_+$ and $\bar{B}_-$ shown in FIG. 3B to produce a continuous wave signal $S_1$ that has a phase $\phi_0$ midway between the phase of the signals $B_+$ and $\bar{B}_-$. Therefore, the continuous wave generator circuit 16 is locked in phase by the signals $B_+$ and $\bar{B}_-$ alternately at every horizontal scanning but is locked at the phase midway between those of the signals $B_+$ and $\bar{B}_-$. The oscillator 17 is driven by the signal $S_1$ to produce a sub-carrier signal of the same phase $\phi_0$ as that of the signal $S_1$. This reference sub-carrier signal is applied to the demodulator 7, being supplied with the plus signal to derive therefrom a predetermined demodulated chrominance signal as previously described.

Figure 3C:
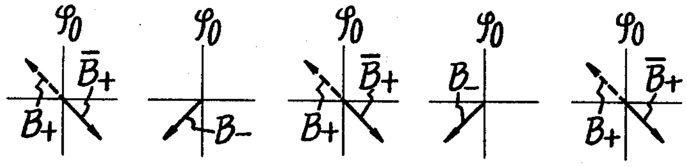
Figure 3D:
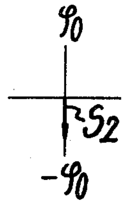

When the minus signals $F_{n+1}$, $F_{n+1}$, $F_{n+3}$, $E'_{n+3}$, . . . continuously derived in that sequence from the switching circuit 4 are fed to the demodulators 7 and 8, the minus chrominance signal and a signal opposite in phase to the plus chrominance signal are alternately transmitted through the switching circuit 11 in the following order: signal $F_{ln+1}$, a signal opposite in phase to the signal $F_{n+2}$, the signal $F_{n+3}$, a signal opposite in phase to the signal $F_{n+4}$, . . . . As a result of this, and as shown in FIG. 3C, two signals are alternately passed through the burst gate circuit. One is these arrival the burst signal $B_-$ contained in the minus signal and delayed in phase by 45° relative to the −(R − Y) axis, the other is a signal $\bar{B}_+$ opposite in phase to the burst signal of the plus signal and advanced in phase by 45° relative to the −(R − Y) axis. As shown in FIG. 3D, both of these signals are applied to the continuous wave generator circuit 16 to derive therefrom a continuous wave signal $S_2$ of the phase $-\phi_0$ just intermediate between the phases of the signals $B_-$ and $\bar{B}_+$. The continuous wave signal $S_2$ is fed to the oscillator 12 to derive therefrom a reference sub-carrier signal of the same phase $-\phi_0$ as the signal $S_2$, which is applied to the demodulator 7. This occurs at the same time that the demodulator 7 is being supplied with the minus signal. In this way a predetermined demodulated color signal is obtained from the demodulator, as previously described. Thus, it may be seen that a predetermined demodulated color signal is always derived from the demodulator 7, irrespective of the condition of the switching circuit 4.

Figure 4A:
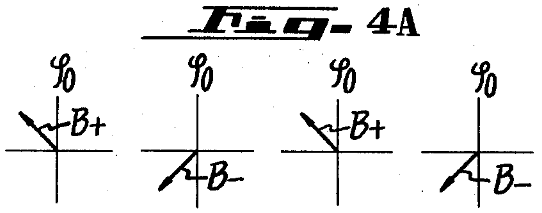
Figure 4B:
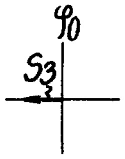
Figure 4C:
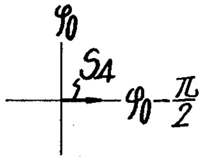

In FIG. 2 the chrominance signal separated by the band pass amplifier 1 is also supplied to a burst gate circuit 19. As in the case of the burst gate 15, the burst signals $B_+$ and $B_-$ contained in the plus and minus signals are alternately transmitted through the gate circuit under control of the circuit 20 as shown in FIG. 4A. As shown in FIG. 4B, these burst signals are applied to a continuous wave generator circuit 21 to derive therefrom a continuous wave signal $S_3$ of a phase midway between those of the signals $B_+$ and $B_-$. This continuous wave signal $S_3$ is fed to an oscillator 22 to drive it to derive therefrom a reference sub-carrier signal of the same phase as the signal $S_3$. As shown in FIG. 4C, the reference sub-carrier signal is applied to a phase inverter 23 to derive therefrom at all times such a reference subcarrier signal $S_4$ of a phase $\phi_0 - \pi/2$ irrespective of the condition of the switching circuit 4. The reference subcarrier signal $S_4$ is supplied to the other demodulator 8. As a result, a predetermined demodulated color signal is always obtained from the demodulator 8, too, irrespective of the condition of the switching circuit 4, as previously described.

Figure 5:
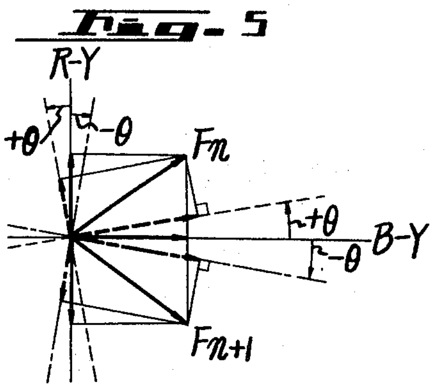

With the provision of phase shifter 18 between the oscillator 17 and the demodulator 7 and the phase shifter 24, which is ganged with the phase shifter 18 and is connected between the phase inverter 23 and the demodulator 8, it is possible, as shown in FIG. 5, to achieve hue control by advancing or delaying the phases of the reference sub-carrier signals fed to the demodulators 7 and 8 by an angle $\theta$, according to whether plus or minus signals are applied to the demodulators 7 and 8. The same result can be obtained by interposing one of the phase shifters between the continuous wave generator circuits 16 and the oscillator 17 and the other phase shifter between the continuous wave generator 21 and the oscillator 22. Accordingly, the signal derived from the oscillator 17 as the reference sub-carrier signal to be fed to the demodulator 7 need not always be of the phase midway between those of the signals $B_+$ and $\bar{B}_-$ or the signals $B_-$ and $\bar{B}_+$, as depicted in FIG. 3.

Figure 6:
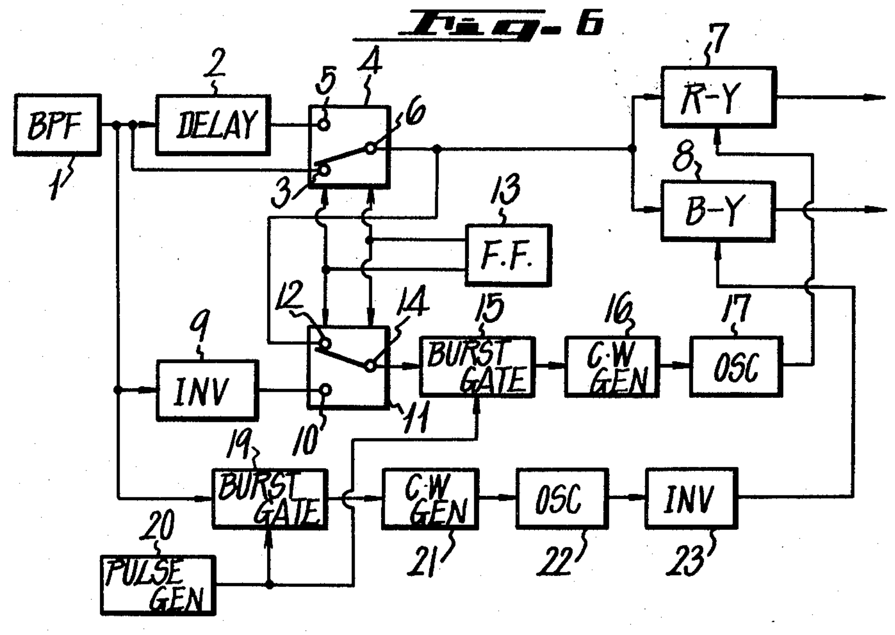
FIG. 6–12 are block diagrams of modifications of the decoding system of FIG. 2.

FIG. 6 illustrates a modified form of this invention in which the signal from the switching circuit 4 is applied directly to one input terminal 10 of the switching circuit 11, and the signal from the band pass amplifier 1 is applied to the other input terminal 12 through a phase inverter circuit 9. Both of the switching circuits 4 and 11 are connected to the flip-flop circuit 13 in a ganged relation to each other to be operated simultaneously. When the switching circuit 4 is in the position indicated in FIG. 6 at the arrival of the plus signal, the switching circuit 11 is also in the position indicated. Thereafter, the two switching circuits move simultaneously to the opposite position at the time of arrival of the minus signal.

As a result of this, when the switching circuit 4 is in the position indicated in FIG. 6 at the time of arrival of the plus signal so that the plus signal is transmitted therethrough to the demodulators 7 and 8, the plus signal is also applied by way of the terminal 10 to the switching circuit 11 and passes through this switching circuit to the output terminal 14. The burst gate 15 is actuated by the gate generator 20 and transmits a signal to the continuous wave generator 16. The generator 16 controls the oscillator 17 to produce a reference subcarrier signal having a phase $\phi_0$. This reference sub-carrier is applied to the demodulator 7 in the same manner as in the circuit in FIG. 2.

On the other hand, in the case in which the switching circuit 4 is in the position indicated in FIG. 6 at the time of arrival of the minus signal, the minus signal and a signal opposite in phase to the plus signal are alternately derived from the switching circuit 11. This causes a reference sub-carrier signal, having a phase $-\phi_0$, to be applied from the oscillator 17 to the demodulator 7. As a result, predetermined demodulated color signals are always derived from the demodulators 7 and 8, irrespective of the condition of the switching circuit 4.

The same results can be obtained by supplying the signal derived from the delay circuit 2 through the phase inverter circuit 9 to the other input terminal 12 of the switching circuit 11 and by actuating the switching operation of the switching circuit 7 in a manner opposite to that in the foregoing.

Figure 7:
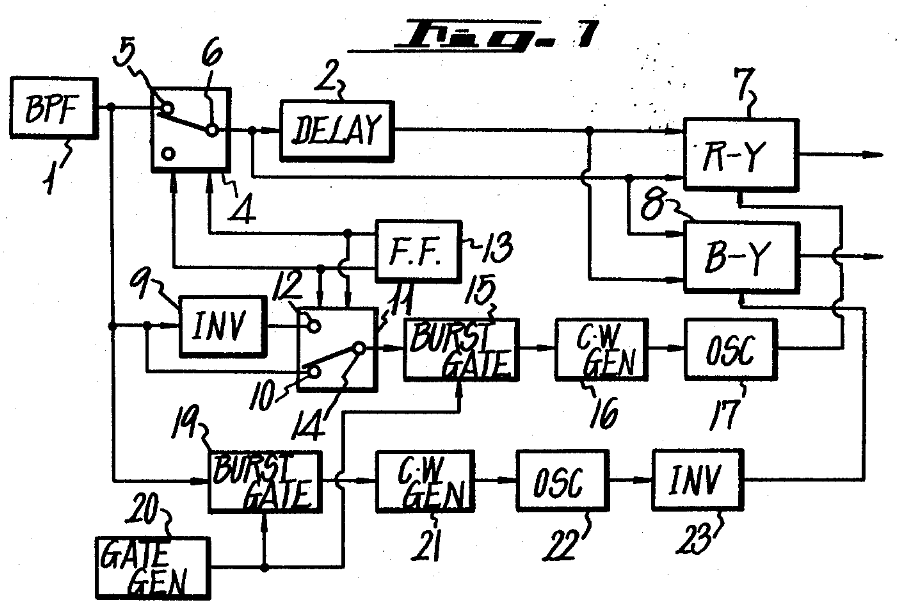

FIG. 7 illustrates another embodiment of this invention similar to that in FIG. 2 except that the signal switching operation is carried out prior to the delay operation. Chrominance signals transmitted through the band pass amplifier 1 are extracted from alternate lines of the composite color television signal separated by the switching circuit 4, which is, in effect, a single-pole-single-throw switch and are supplied to the demodulators 7 and 8 through two paths. One is a direct path and the other goes through the delay circuit 2 by means of which signals are delayed for one line interval.

Exactly the same demodulating operation as in the example in FIG. 2 can be achieved in the circuit in FIG. 7. The switching circuit 11 is placed in the condition indicated in FIG. 7 at the arrival of the plus signal and is switched to the opposite position at the time of arrival of the minus signal. The switching circuit 4 is illustrated in position to transmit a plus signal to be supplied to the demodulators 7 and 8. On the other hand, the switching circuit 11 can be placed in the position opposite to that indicated in FIG. 7 at the time of arrival of the plus signal and returned to the indicated position at the time of arrival of the minus signal. In that case, the switching circuit 4 is in the condition for transmitting the minus signal and supplying it directly and continuously to the demodulators 7 and 8.

Figure 8:
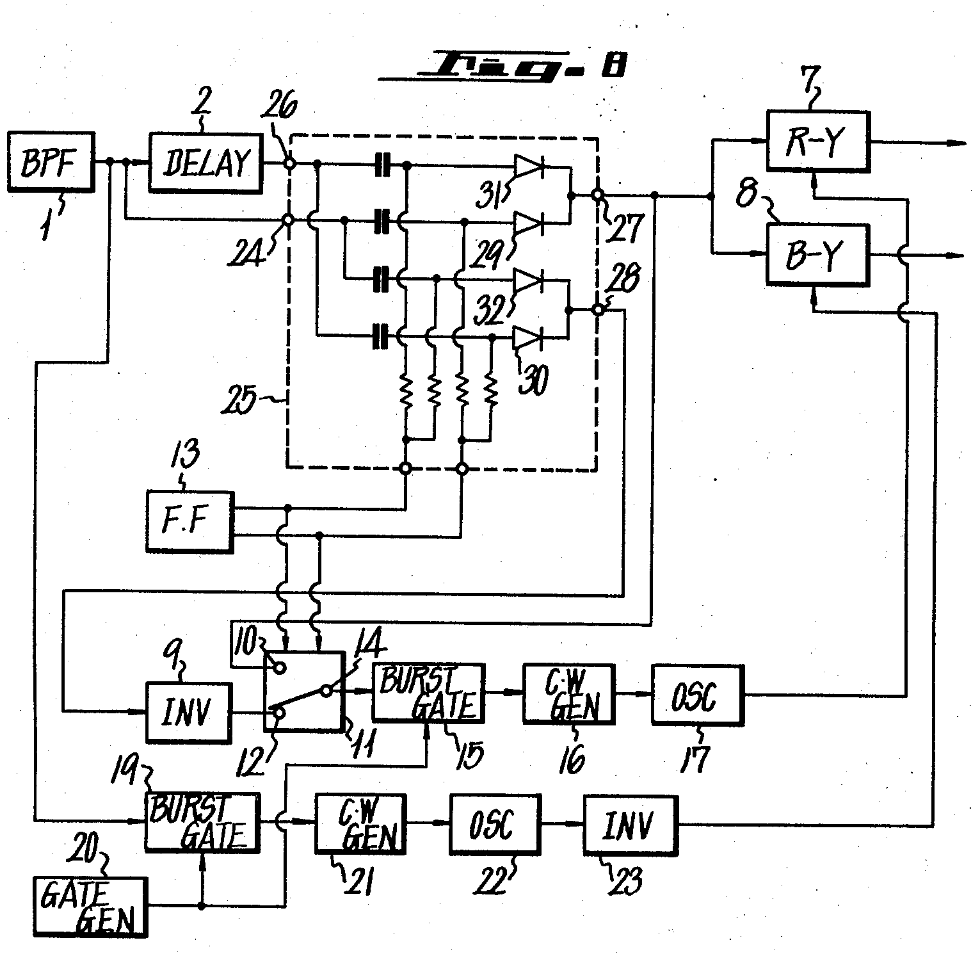

FIG. 8 shows another embodiment of this invention that includes a diode switching arrangement for separating the delayed and non-delayed chrominance signals. The chrominance signals separated from the rest of the composite television signal by the band pass amplifier 1 are applied directly to one input terminal 24 of a diode switching circuit 25 and are also applied to the delay circuit 2. The output of the delay circuit is applied to another input terminal 26 of the switching circuit 25. The operation of the switching circuit 25 is controlled by the flip-flop circuit 13 which causes the switch to change from one of its two conditions to the other at the end of every horizontal scanning line.

The switching circuit 25 has one output terminal 27 connected to the input terminals of the two demodulators 7 and 8. The switching circuit also has another output terminal 28 connected to the input of the inverter 9. The output of this inverter is connected to the input terminal 12 of another switching circuit 11, which is also controlled by the flip-flop circuit 13 to switch from one of its conditions to the other at the end of every horizontal scanning line. However, it is not necessary that the switching circuit 11 be controlled by the same flip-flop circuit 13 as the switching circuit 25, and it may, therefore, be controlled by a separate flip-flop circuit. The remainder of the circuit in FIG. 8 is identical with that in FIG. 2 and operates in the same way.

Within the switching circuit 25 are four diodes 29–32. Two of the diodes 29 and 30 are connected to one of the output terminals of the flip-flop 13 to be rendered conductive at the same time. The other two diodes 31 and 32 are connected to the other output terminal of the flip-flop circuit 13 to be rendered conductive when the diodes 29 and 30 are non-conductive. The circuit 25 is arranged so as to make the diodes 29 and 30 conductive at the arrival of the plus signal and the diodes 31 and 32 conductive at the time of arrival of the minus signal. As a result, the plus signal is transmitted twice in a row through the output terminal 27 to the demodulators 7 and 8 in the order $F_n$, $F'_n$, $F_{n+2}$, $F'_{n+2}$, . . . . In the same manner the minus signals, which are $F'_{n-1}$, $F_{n+1}$, $F'_{n+1}$, $F_{n+3}$, . . . may also be sequentially derived twice in a row at the other output terminal 28. The plus chrominance signal and a signal opposite in phase to the minus chrominance signal are alternately obtained from the switching circuit 11, irrespective of the condition of this switching circuit according to the arrival of the plus or minus signal. Therefore, there is no reason for the switching circuits 11 and 25 to be ganged together; they may be actuated by separate means, such as the flip-flop 13 and another pulse source synchronized with this flip-flop in time but not necessarily in polarity of output signal. In this way, a reference sub-carrier signal, having a phase $\phi_0$, may be obtained from the oscillator 17 and fed to the demodulator 7 during the times that this demodulator is also supplied with the plus signals to obtain a predetermined demodulated color signal. Alternately, if the flip-flop circuit 13 has been reversed to cause the switching circuit 25 to make the diodes 31 and 32 conductive at the arrival of the plus signal and to make the diodes 29 and 30 conductive at the arrival of the minus signal, the minus signal is available at the output terminal 27 to be applied to the demodulators 7 and 8 while the plus signal is derived at the other output terminal 28. As a result, the minus chrominance signal and a signal opposite in phase to the plus chrominance signal are alternately derived from the switching circuit 11, irrespective of the condition of this switching circuit. A reference sub-carrier signal, having a phase $-\phi_0$, is obtained from the oscillator 17 and is fed to the demodulator 7 that is being supplied with the minus signal to obtain a predetermined demodulated color signal.

In the embodiment shown in FIG. 8, the signal derived from the burst gate circuit 15 is automatically controlled by the condition of the switching circuit 25. The switching circuit conducts signals to its output terminals 27 and 28 to provide, automatically, a reference subcarrier signal corresponding to the signal fed to the demodulator 7 so that the switching circuit 11 may be actuated independently of the switching circuit 25 as previously described.

Figure 9:
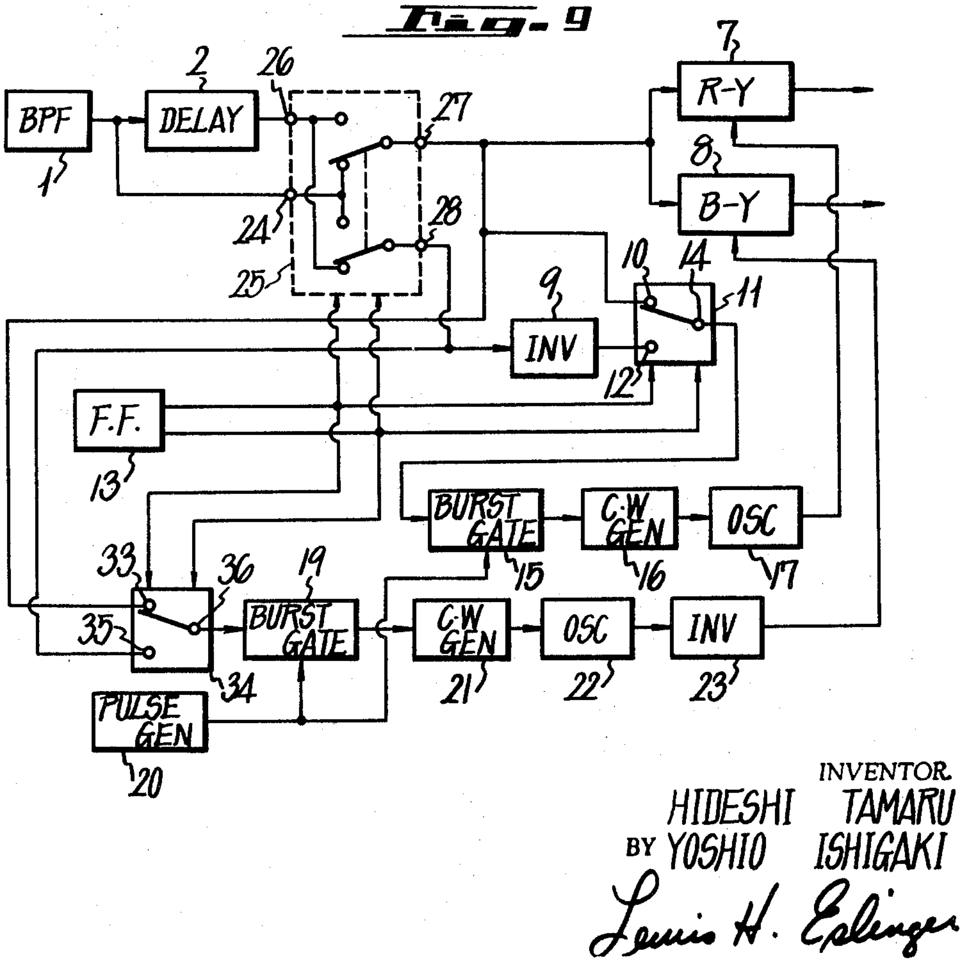

FIG. 9 shows another embodiment of the invention in which the signal derived at one output terminal 27 of the switching circuit 25 of FIG. 8 is supplied to one input terminal 33 of a switching circuit 34. The signal derived at the other output terminal 28 of the switching circuit 25 is applied to the other input terminal 35 of the switching circuit 34. The switching circuit 34 transmits the plus and minus signals alternately by being actuated at every horizontal scanning line, irrespective of whether the switching circuit 25 has been actuated or not. Thus, the switching circuit 25 may be either in the condition in which the plus signal is available at the output terminal 27 and the minus signal at the output terminal 28, or vice versa. The plus and minus signals alternately transmitted through the switching circuit 34 are supplied to the burst gate circuit 19. As described previously, this causes a reference sub-carrier signal, having a phase $\phi_0 - \pi/2$ to be supplied continuously to the demodulator 8. Although the switching circuit 34 is actuated by the flip-flop circuit 13 that controls the operation of the switching circuit 25, the switching circuit 34 serves only to change over the signals from the output terminals 27 and 28 at every horizontal scanning line and, therefore, need not be operated in ganged relation to the switching circuit 25, as is the case with the switching circuit 11 in the previous figures. Instead, the switching circuit 34 may be actuated by another flip-flop circuit.

Figures 10, 11:
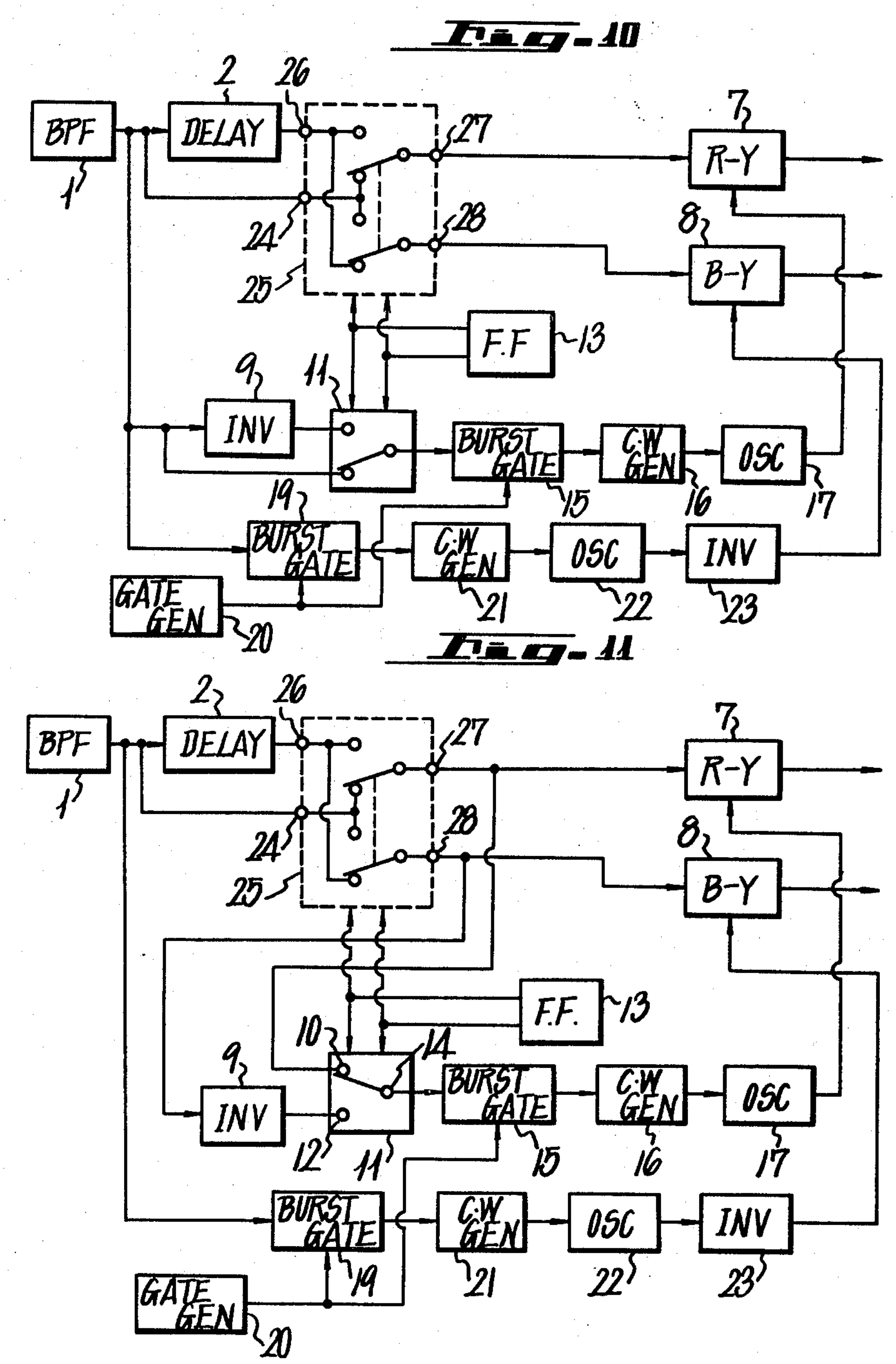

FIG. 10 illustrates another embodiment of the invention in which the switching circuit 25 is used to obtain the signals to be fed to the demodulators 7 and 8 in the same manner as in FIG. 8, except that the signal from the output terminal 27 is connected directly only to the demodulator 7, and the signal from the output terminal 28 is connected only to the other demodulator 8. Therefore, one of the demodulators is supplied only with the plus signal and the other is supplied only with the minus signal, but whether the demodulator 7 is supplied with the plus signal and the demodulator 8 supplied with the minus signal, or vice versa, depends on the setting of the switch 25 relative to the signal received by the receiver. The reference sub-carrier signals to be fed to the demodulators 7 and 8 are produced in the same manner as described in connection with the circuit in FIG. 2. In accordance with this technique, the switching circuit 11 is actuated by the alternating signal from the flip-flop 13 in ganged relation with the switching circuit 25. Therefore, when the switching circuit 25 is actuated in such a manner as to cause the plus signal to be present at the output terminal 27 and the minus signal to be present at the output 28, the switching circuit 11 is simultaneously in the position indicated in FIG. 10 at the arrival of the plus signal and in the opposite position at the arrival of the minus signal. This causes the plus signal and a signal opposite in phase to the minus signal to be transmitted through the switching circuit 11. When these two signals from the switching circuit 11 are applied through the burst gate 15 to the continuous-wave generator 16, they cause a reference sub-carrier signal having the phase $\phi_0$ to be applied to the demodulator 7 that is being supplied with the plus signal.

On the other hand, if the minus signal is being applied to the demodulator 7 from the terminal 27 and the plus signal is being applied to the demodulator 8 from the terminal 28, a reference sub-carrier having a phase $-\phi_0$ must be applied to the demodulator 7. This is generated by causing the switching circuit 11 to be in the condition opposite to that shown in FIG. 10 at the time of arrival of the plus signal and to the condition indicated at the time of arrival of the minus signal. The output from the switching circuit would then consist of the minus signal followed by a signal opposite in phase to the plus signal, and this combined signal controls the continuous-wave generator 16 and the oscillator 17 to produce the necessary sub-carrier signal having the phase.

As a result of this mode of operation, the proper demodulated color signals are always derived from the demodulators 7 and 8, irrespective of the polarity of the output signal from the flip-flop 13 in relation to the time of arrival of the television signal. It is, of course, necessary that the flip-flop 13 be synchronized to change its output condition synchronously with the horizontal scanning control signals. The output demodulated signals emerge from the demodulator 7 in the following order:

$(E_R - E_Y)'_{n-1}$, $(E_B - E_Y)_{n+1}$, $(E_B - E_Y)'_{n+1}$, $(E_B - E_Y)_{n+3}$ . . . . Conversely, when the demodulated signals from the demodulator 7 arrive in the order $(E_R - E_Y)_{n+1}$, $(E_R - E_Y)'_{n+1}$, $(E_R - E_Y)_{n+3}$ $(E_R - E_Y)_{n+}$, . . . , the demodulated signals from the demodulator 8 emerge in the order:

$(E_B - E_Y)'_n$, $(E_B - E_Y)_{n+2}$, $(E_B - E_Y)'_{n+2}$, $(E_B - E_Y)_{n+4}$, . . .

FIG. 11 shows still a further modification of the present invention in which the reference sub-carrier signals to be applied to the democulators 7 and 8 are produced in the same manner as in FIG. 8. The demodulators 7 and 8, on the other hand, are connected to the output terminals 27 and 28 in the same manner as the corresponding demodulators in FIG. 10.

Figure 12:
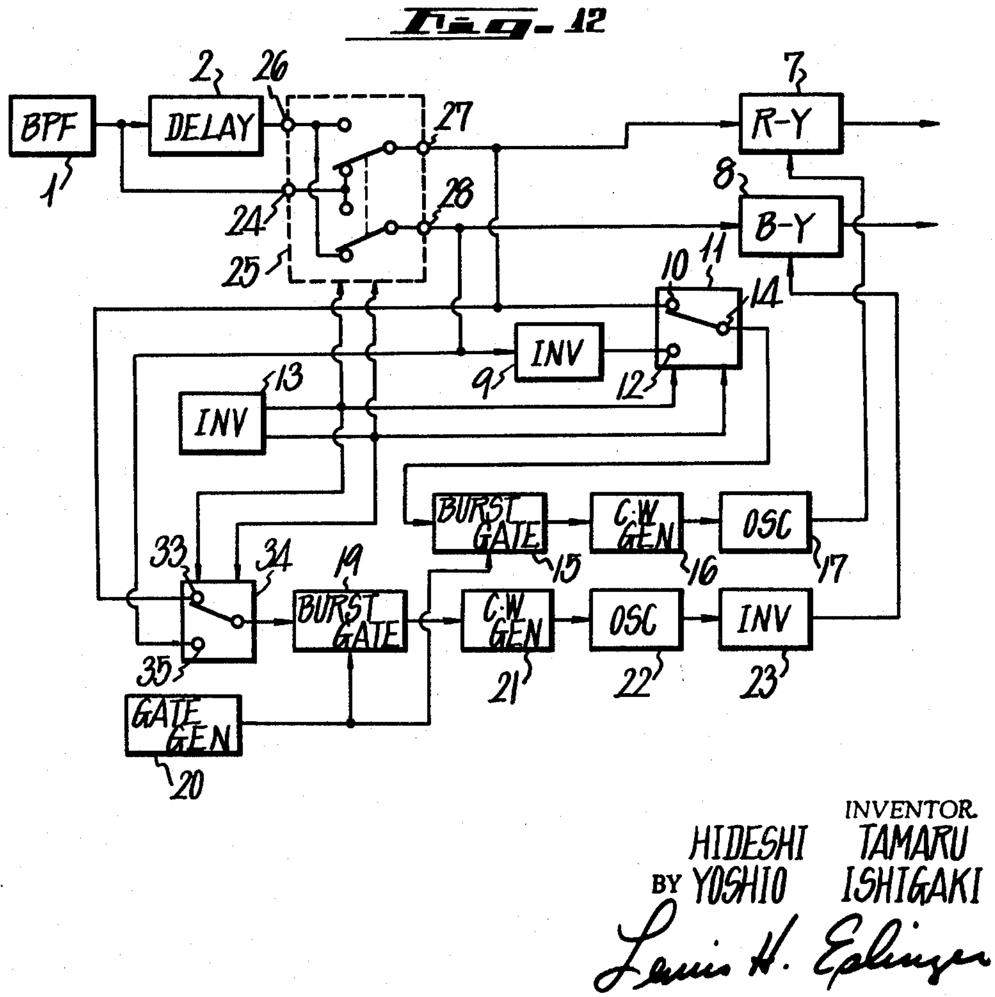

In the embodiment of the invention shown in FIG. 12, the demodulators 7 and 8 are again connected to the switch 25 in the same manner as in FIG. 10, but the reference sub-carrier signals to be applied to these demodulators are produced in the same manner as that employed in FIG. 9.

In the embodiments shown in FIG. 2 and 6 to 9, the chrominance signal separated by the band pass amplifier 1 may be supplied without change to the demodulator 8. In that case, demodulated signals $(E_B - E_Y)_n$, $(E_B - E_Y)_{n+1}$, $(E_B - E_Y)_{n+2}$, $(E_B - E_Y)_{n+3}$, . . . are sequentially from the demodulator 8.

In the embodiments shown in the FIGS. 2, 6, 7, and 10, it is possible for the switching circuit 11 to be actuated in such a manner that the reference sub-carrier signal obtained from the oscillator 17 will have a phase $-\phi_0$ at the time that the switching circuit 4 or 25 is transmitting the pulse signal to the demodulator 7. The sub-carrier signal of the phase $-\phi_0$ would be generated under such conditions if the minus signal and a signal opposite in phase to the plus signal were used to control the operation of the oscillator 17. Alternatively, when the switch circuit 4 or 25 is in condition to supply the minus signal to the demodulator 7, the plus signal, at a signal opposite in phase to the minus signal, are alternatively passed through the burst gate 15 and cause the oscillator 17 to produce an output signal with a phase $\phi_0$ to be applied to the demodulator 7 through a phase inverter.

Another modification that may be made in the various embodiments in the invention shown is that the burst gate circuit 19 may be located in the signal path ahead of the switching circuits 11 and 34.

Figure 13A:
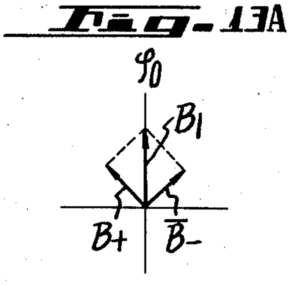
Figure 13B:
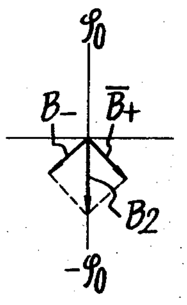

In the embodiments shown in FIGS. 8, 9, 11, and 12 in which the switching circuit 25, commonly referred to as a dual switch, is used, the plus signal is continuously derived from one of the output terminals 27 and 28 of the minus signal is continuously derived for the other of those output terminals. As a result, the switching circuit 11 may be replaced by an adder. This would permit the signal from the output terminal 27 to be added to a signal produced by inversion of the signal from the other output terminal 28 by means of the phase inverter 9. The sum of these two signals could then be applied to the burst gate circuit 15. With this arrangement, when the plus signal is obtained from the terminal 27, the burst signal $B_+$ and a signal $\overline{B}_-$ opposite in phase to the burst signal in the minus signal are added together to derive a burst signal $B_1$, having a phase $\phi_0$. This vector addition is shown in FIG. 13A. Conversely, when the minus signal is derived at the output delay 27, the burst signal $B_-$ and a signal $\overline{B}_+$ opposite in phase to the burst signal in the plus signal, are added together to derive from the circuit 15 a burst signal $B_2$, having the phase $-\phi_0$ as shown in FIG. 13B. Accordingly, the chrominance signal can be properly demodulated in the demodulator 7 in the same manner described previously by controlling the continuous wave generator circuit 16 with the signal $B_1$ or $B_2$. However, it is important that the signals to be added together be of the same magnitude since the phase of the resultant sum is dependent not only on the phases of the components but on their relative amplitudes. The switching circuit 34 in the embodiments in FIG. 9 and 12 may also be replaced by an adder.

In the foregoing description the non-delayed, original chrominance signal and the chrominance signal delayed behind it for one horizontal line interval are utilized alternatively to produce a continuous selected chrominance signal. As an alternative, it is possible to utilize one line of the original chrominance signal and a signal delayed an odd number of times as long as a horizontal line interval. Furthermore, this invention is not limited to producing reference sub-carrier signals along the R − Y and B − Y axes. The invention is also applicable to producing carrier signals for demodulating I and Q signals or the like.

Figure 14:
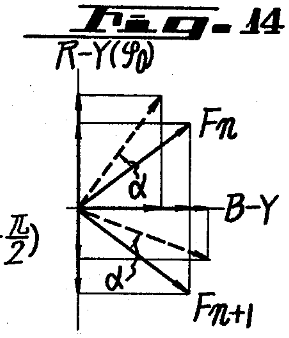
FIG. 13A, 13B, 14, & 15 are vector diagrams for explaining the operation of the decoding system of this invention.
Figure 15:
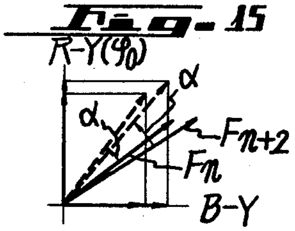

With the present invention, the circuit construction is simple, and there is no deterioration in the quality of the reproduced picture. The receiver employs only the delay circuit 2 and a switching circuit between the band pass amplifier 1 and the demodulators 7 and 8. This is extremely simple in comparison with the so-called standard PAL decoding system. In the simplified PAL decoding system, the signal from the band pass amplifier would be applied directly to the demodulators. When a phase distortion $\alpha$ is present, as shown in FIG. 14, the magnitude of the demodulated color signals of adjacent lines vary in opposite directions, and the saturation difference between the color signals of adjacent lines becomes great enough to cause deterioration in the quality of the reproduced picture. With the present invention, however, there is no difference in saturation between adjacent lines of the same signal. In addition, the difference in saturation caused by the phase distortion $\alpha$ between adjacent lines of different signals is too small to produce any deterioration in the quality of the reproduced picture. This is clear from the vector diagram in FIG. 15. Further, in accordance with the present invention, two signals are produced alternately. One of these is the burst signal that corresponds to one line interval of time in which the modulation axis for one color signal has one phase. The alternate signal is a signal opposite in phase to the burst signal for the remaining line intervals. In the remaining line intervals the modulation axis for the aforesaid color signal has the opposite phase. These signals are produced alternately in accordance with the extraction, first, of a non-delayed chrominance signal and then the extraction of a signal delayed for one horizontal scanning interval or an odd number of scanning intervals. The reference sub-carrier signal to be used in demodulating the aforesaid color signal is produced under the control of the aforesaid separated signals. Consequently, the chrominance signals applied to the demodulators can always be demodulated with reference sub-carrier signals of pre-determined phases irrespective of the alternate extracting operation of the non-delayed signal and the delayed signal. Furthermore, this extraction need not be controlled, which permits further simplification of the circuit construction of the present invention.

What is claimed is:

1. A color television decoding system for a receiver adapted to receive a composite color television signal comprising color synchronizing burst signals, luminance signal components, and first and second chrominance signal components amplitude modulated on a common sub-carrier and having quadrature phase modulation axes, the color phase sequence of the first and second chrominance signal components being periodically reversed by periodic reversal of the phase of the modulation axis for one of the chrominance signal components, said decoding system comprising:

A. Delay means for delaying said chrominance components a predetermined length of time;
B. First switching means for transmitting segments of said chrominance components for selected intervals of time, each equal to said predetermined length of time, whereby said delay means and said switching means cooperate to produce a continuous selected chrominance signal;
C. First and second demodulator means to demodulate said continuous selected chrominance signal;
D. First and second generator means to generate first and second reference sub-carrier signals, respectively;
E. Control means connected to said generator means; and
F. Second switching means for selectively connecting said burst signals to said control means to control the phase of said sub-carrier signals.

2. The decoding system of claim 1, comprising, in addition, a phase shift control circuit connected between said first generator means and said first demodulator to control the phase of said first reference sub-carrier signal.

3. The decoding system of claim 2, comprising, in addition, a second phase shift control circuit connected between said second generator means and said second demodulator and ganged with said first-named phase shift control circuit to control the phase of both of said reference sub-carrier signals simultaneously.

4. The decoding system of claim 1, in which both of said switching means operate synchronously at the line repetition rate of said television signal.

5. The decoding system of claim 4, in which said switching means are connected to operate in ganged relationship.

6. The decoding system of claim 1, in which:

A. Said delay means comprises:
  1. an input terminal to be connected to a source of said chrominance signal components, and
  2. an output terminal; and
B. Said first switching means comprises:
  1. first and second input terminals, and
  2. an output terminal, said first input terminal being connected to the source of said chrominance signal components, said second input terminal being connected to said output terminal of said delay means, and said output terminal of said switching means being connected to said first demodulator means to supply chrominance signal components thereto.

7. The decoding system of claim 6, in which said output terminal is connected to both of said demodulator means to supply said continuous selected chrominance signal thereto.

8. The decoding system of claim 6, in which said first switching means comprises a second output terminal connected to said second demodulator means to supply chrominance signal components thereto.

9. The decoding system of claim 1, in which:

A. Said first switching means comprises:
  1. an input terminal to be connected to a source of said chrominance signal components, and
  2. an output terminal connected to both of said demodulators to supply said segments of said chrominance components thereto; and
B. Said delay means comprises:
  1. an input terminal connected to said output terminal of said first switching means, and
  2. an output terminal connected to said demodulator means to supply delayed repetitions of said segments of said chrominance components thereto.

10. The decoding system of claim 1, comprising, in addition, an inverter connected in series with said second switching means to invert selected burst signals.

11. The decoding system of claim 10, in which said control means comprises:

A. A first control circuit connected to said first generator means; and
B. A second control circuit connected to said second generator means.

12. The decoding system of claim 11, in which:

A. Said second switching means comprises:
  1. a first input terminal connected to said inverter to receive inverted burst signals,
  2. a second input terminal to receive non-inverted burst signals, and
  3. an output terminal connectable in a first condition to said first input terminal thereof and in a second condition to said second input terminal thereof; and
B. Said first control circuit is connected to the output terminal of said second switching means to receive, alternately, non-inverted burst signals and inverted burst signals.

13. The decoding system of claim 12 in which said second input terminal of said second switching means is connected to input terminals of said inverter and said delay means.

14. The decoding system of claim 12 in which said first control circuit comprises:

A. A burst gate circuit connected to said output terminal of said second switching means to receive therefrom each burst signal in succession, alternate ones of said burst signals being inverted, said burst gate being connected to said first generating means to supply inverted and non-inverted burst signals alternately thereto; and B. A gate generator connected to said burst gate circuit to cause said burst gate to transmit only said burst signals.

15. The decoding system of claim 14 in which said second control circuit comprises a second burst gate circuit connected to receive each of said burst signals in sequence, the output of said second burst gate circuit being connected to said second generating means and said gate generator being connected to said burst gate circuit to control the operation thereof to transmit each of said burst signals in sequence to said second generating means.

16. The decoding system of claim 11 in which:

A. Said first generator means comprises:

1. a first continuous wave generator, 2. a first oscillator connected to said continuous wave generator to be controlled thereby and connected to said first demodulator means to provide reference sub-carrier signals therefor; and B. Said second generator means comprises:

1. a second continuous wave generator, and 2. a second oscillator connected to said second continuous wave generator to be controlled thereby and connected to said second demodulator means to provide reference sub-carrier signals therefor.

17. The decoding system of claim 12 in which said second input terminal of said second switching means is connected to said output terminal of said first switching means and said first and second switching means are ganged together.

18. The decoding system of claim 12 in which said first switching means comprises:

A. A first input terminal connected to said delay means to receive delayed chrominance components;

B. A second input terminal to receive non-delayed chrominance components;

C. A first output terminal; and

D. A second output terminal, each of said output terminals being connectable alternately to either of said input terminals, said first input terminal of said second switching means being connected to said first output terminal of said first switching means to receive non-inverted burst signals therefrom, said inverter being connected to said second input terminal of said second switching means to supply inverted burst signals thereto, and said output terminal of said second switching means being switched alternately at the end of each line interval from said first input terminal thereof to said second input terminal thereof to transmit, alternately, inverted and non-inverted burst signals to said first control circuit.

19. The decoding system of claim 18 comprising, in addition, a third switching means comprising:

A. A first input terminal connected to said first output terminal of said first switching means to receive burst signals therewith;

B. A second input terminal connected to said second output terminal of said first switching means to receive burst signals therefrom; and C. An output terminal connectable alternately to said first and second input terminals thereof to transmit said burst signals in succession through said third switching means.

20. The decoding system of claim 12 in which said first switching means comprises:

A. A first output terminal connected directly to said first demodulator means; and B. A second output terminal connected directly to said second demodulator means.

21. The decoding system of claim 20 in which said first output terminal of said first switching means is connected to said first input terminal of said second switching means, and said inverter connects said second output terminal of said first switching means to said second input terminal of said second switching means.

22. The decoding system of claim 21 comprising, in addition, a third switching means comprising:

A. A first input terminal connected to said first output terminal of said first switching means;

B. A second input terminal connected to said second output terminal of said first switching means; and C. An output terminal switchable to either of said input terminals thereof, said output terminal being connected to said second control circuit to supply signals to control the phase of said second generator means.

* * * * *